United States Patent [19]

Winning

[11] Patent Number: 5,002,177
[45] Date of Patent: Mar. 26, 1991

[54] CASE DRIVE CONVEYOR

[75] Inventor: Steven A. Winning, Hudson, Ohio

[73] Assignee: Figgie International, Inc., Willoughby, Ohio

[21] Appl. No.: 387,354

[22] Filed: Jul. 31, 1989

[51] Int. Cl.⁵ .............................................. B65G 15/10
[52] U.S. Cl. ..................................... 198/810; 198/817; 198/813; 198/832
[58] Field of Search ............... 198/817, 813, 810, 832, 198/855, 856

[56] References Cited

U.S. PATENT DOCUMENTS

| 4,032,003 | 6/1977 | Hull | 198/832 X |
| 4,657,131 | 4/1987 | Brychta et al. | 198/810 |
| 4,858,747 | 8/1989 | Eunson | 198/856 X |

FOREIGN PATENT DOCUMENTS

| 261160 | 12/1974 | U.S.S.R. | 198/832 |
| 1312025 | 5/1987 | U.S.S.R. | 198/813 |

Primary Examiner—Joseph E. Valenza
Assistant Examiner—Keith L. Dixon
Attorney, Agent, or Firm—Renner, Kenner, Grieve, Bobak, Taylor & Weber

[57] ABSTRACT

A conveyor or case drive mechanism includes a continuous chain loop having two or more drive motors positionally spaced there along. A sensor is associated with the motors for sensing slack in the chain at the associated motor. When a predetermined amount of slack in the chain is no longer present at the motor, the sensor presents an output signal which, through a speed control device, increases the rotational speed of the associated motor until generation of the requisite slack in the chain has been achieved. Each motor in the chain drive loop has a sensor structure associated with it such that each motor provides a motive force to the chain.

8 Claims, 2 Drawing Sheets

CASE DRIVE CONVEYOR

TECHNICAL FIELD

The invention herein resides in the art of article handling equipment and, more particularly, to a chain drive conveyor for transporting cases to and from work stations in a processing line. Specifically, the invention relates to the effective synchronization of drive motors for conveyor chains.

BACKGROUND ART

In the packaging industry, it is common to transport cases on conveyors formed from bar chain. Typically, a pair of continuous loops, each with its own drive, are provided to transport such cases to work stations at which they are filled, emptied, closed, opened, or otherwise treated. Typically, the nature of the load being transported dictates that each loop include two or more drive motors, be they electric, pneumatic, or hydraulic. The provision of a plurality of drive motors in each loop serves to evenly distribute the load between the various drives of the system. However, if the motors are not totally synchronous, one motor will eventually assume the entire load of the system, while the others will perform little or no work at all. Such a situation not only is inefficient, but generally gives rise to failures and the need for service and repair, such being inconsistent with the purpose for providing plural drives in the system.

It has been found that when two or more motors are used in a drive system, a degree of slack in the chain is necessary at each motor to assure that the load is equally distributed among them. When slack is absent at a first motor, the remaining motor or motors are required to perform the work of the first motor, the absence of slack indicating that there is no disparity in force within the chain on opposing sides of the motor.

In the prior art, it has been taught to provide motors in such conveyor systems with torque limiting or slip clutches. In such systems, if one drive motor begins to outrun the other, the clutch slips until the load distribution changes. However, in such prior art systems, the correction is inefficiently achieved by inhibiting the operation of the motor doing all of the work, instead of increasing the operational speed of the motor doing virtually no work at all.

Further, the prior art teachings in this regard suggest that complex systems are necessary to attain motor synchronization, such systems being given to wear, adjustment problems, and repeated service interruptions.

DISCLOSURE OF INVENTION

In light of the foregoing, it is a first aspect of the invention to provide a case drive conveyor which continually seeks to maintain synchronization of plural drive motors.

Another aspect of the invention is the provision of a case drive conveyor which maintains load distribution in a plural drive conveyor system.

Another aspect of the invention is the provision of a case drive conveyor which eliminates the need for slip clutches and the like.

Still a further aspect of the invention is the provision of a case drive conveyor which attains appropriate distribution of a working load by positively acting on a motor which is not working to its efficiency level, rather than restricting the operation of a motor which is exceeding its desired level.

Yet an additional aspect of the invention is the provision of a case drive conveyor which is readily conductive to implementation with existing conveyor systems.

The forgoing and other aspects of the invention which will become apparent as the detailed description proceeds are achieved by a case drive mechanism, comprising: a pair of conveyors in spaced apart parallel relationship to each other; a pair of drive means for driving said pair of conveyors, each of said drive means being exclusively connected to one of said conveyors; sensing means in juxtaposition to each of said conveyors for sensing slack in said conveyors; and speed control means interconnected with said sensing means and said drive means for altering a drive speed of said drive means in response to an output signal from said sensing means.

Other aspects of the invention which will become apparent hereinafter are attained by a conveyor for a case drive mechanism, comprising: a continuous chain loop; first and second motors operatively interconnected with and driving said chain loop; sensing means associated with at least one of said motors for sensing slack in said chain loop at said motor, and presenting an output signal when said slack is less than a predetermined amount; and speed control means interposed between said sensing means and said one of said motors for increasing the speed at which said motor drives said chain loop upon receipt of said output signal.

BRIEF DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
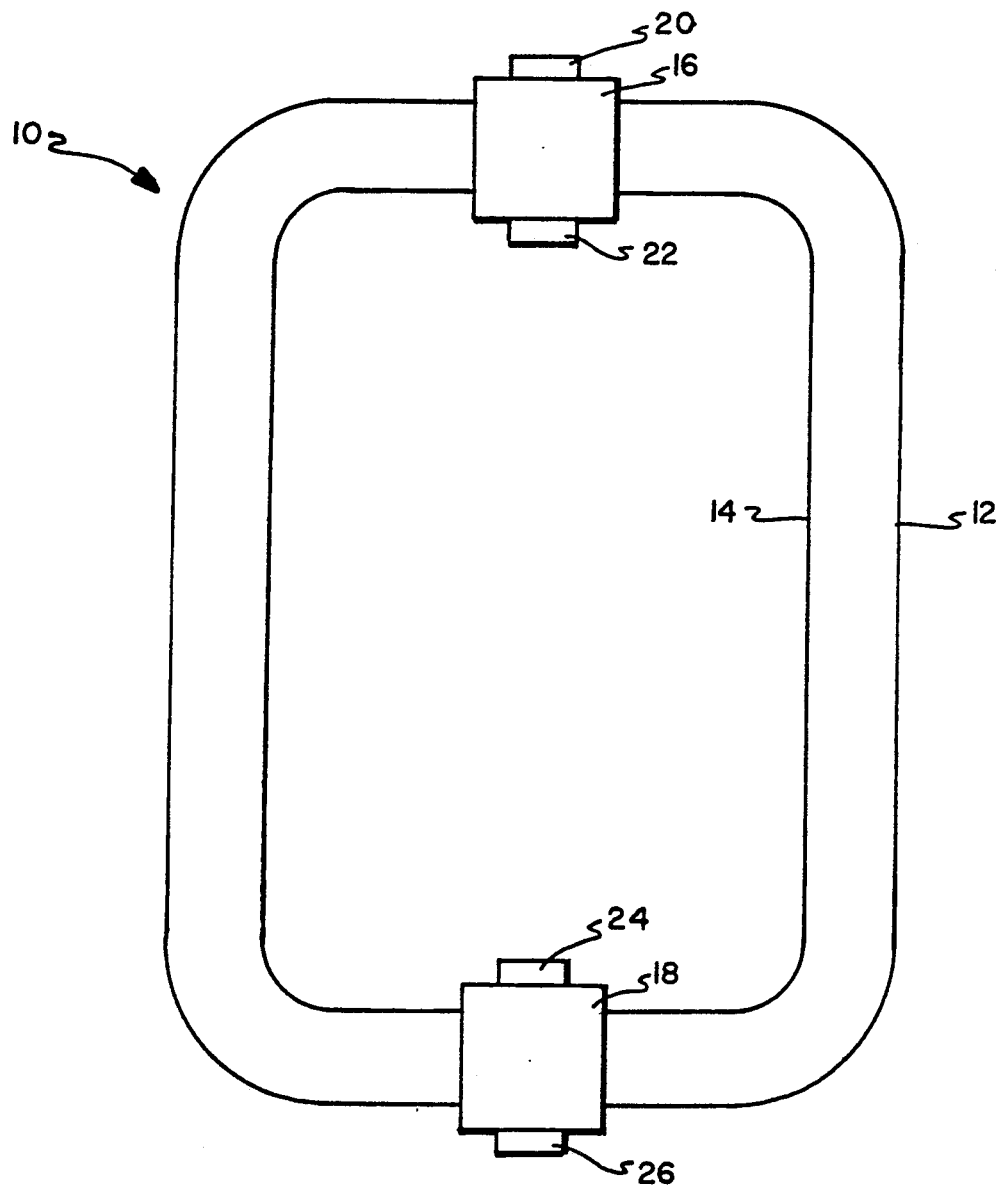
FIG. 1 is an illustrative plan view of a conveyor system according to the invention.
Figure 2:
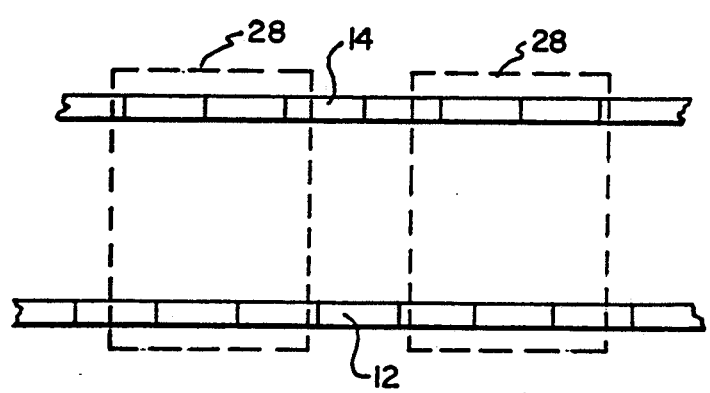
FIG. 2 is a partial sectional view of the conveyor system of FIG. 1, showing it in receipt of cases for transport.

Referring now to the drawings and more particularly FIGS. 1 and 2, it can be seen that a conveyor system according to the invention is designated generally by the numeral 10. It will be appreciated that the conveyor system 10 may be used for any of numerous purposes, but typically to transport cases for filling or emptying at appropriate work stations. The conveyor system 10 preferably comprises a pair of continuous loop bar chains 12, 14 in spaced apart parallel relationship to each other. A pair of drive stations 16, 18 are spaced along the continuous paths of the bar chains 12, 14 to provide appropriate drive thereto. It will be appreciated by those skilled in the art that the number of drive stations 16, 18 will be dependent upon the length of the continuous loop of the conveyor system 10, the volume of mass of material to be handled thereby, and the operational constraints of the motors or other drive mechanisms at the drive stations.

Each of the drive stations 16, 18 has associated therewith a pair of motors 20-26, a motor at each station being associated with one of the drive chains 12, 14. Those skilled in the art will understand that the motors 20-26 may be of any suitable nature, such as electric, hydraulic, or pneumatic. Each is provided with an appropriate shaft and sprocket for engagement with the related bar chain 12, 14 to achieve the desired transporting action.

As shown in FIG. 2, the bar chains 12, 14 of the conveyor system 10 are adapted for receiving a plurality of cases 28 thereon, for transport through various work stations. Because of the resultant load on the conveyor system 10, resulting not only from the cases, but also the weight of the bar chains 12, 14 themselves, plural drive station 16, 18 are required. With the introduction of such plural drive stations, it becomes necessary to assure that the drive stations share the load of moving the associated chains 12, 14 equally. In prior art systems, it has been known that one drive station may overrun the other, resulting in one motor performing substantially all of the work necessary for achieving the transporting action, while the other motor serves as a load, performing little if any work.

Figure 3:
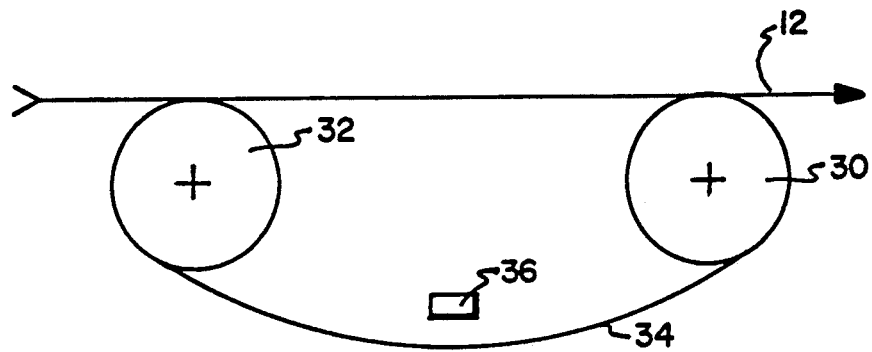
FIG. 3 is an illustrative front elevational view of a drive station according the invention.
Figure 4:
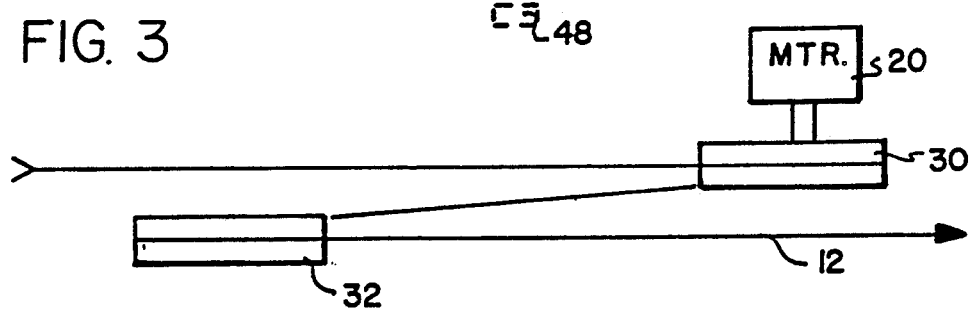
FIG. 4 is a top plan view of the drive station of FIG. 3.

As shown in FIG. 3, associated with each of the chains 12, 14 and each of the stations 16, 18, is a drive pulley 30 and an idle pulley 32. For example, at the station 16 each of the motors 20, 22 would have an assoicated drive pulley 30 connected to the motor shaft and idle pulley 32 interconnected with the associated chain 12, 14. FIGS. 3 and 4, show the interconnection of the motor 20 with the associated pulleys 30, 32 and the chain 12. As noted, the pulleys 30, 32 are offset with respect to each other such that the bar chain 12 may be wrapped about the two pulleys, continuing its straight path, while providing for a loop of slack 34 between the drive pulley 30 and the idle pulley 32. As will be appreciated by those skilled in the art, when slack exists in the chain 12 between the pulleys 30, 32 as shown at 34, the associated motor 20 is performing work in moving the chain 12. If the slack betwen the two pulleys disappears, and the chain 12 becomes taut therebetween, then it is apparent that the motor 26 has overridden the motor 20 and is performing virtually all of the work in transporting the chain 12. Accordingly, it is of utmost importance that a degree of slack 34 be provided between the pulleys 30, 32.

To assure the presence of the slack 34, a switch or other appropriate sensor 36 is interposed between the two pulleys in juxtaposition to the arcuate path of the chain 12 as designated by the numeral 34. Those skilled in the art will readily appreciate that the switch or sensor 36 may be of any suitable nature, such as a mechanical limit switch, photo detector, or the like. Irrespective of its nature, when the slack 34 contacts the switch or sensor 36, an output signal is generated to appropriately modify the action of the associated motor to regenerate the requisite slack.

Figure 5:
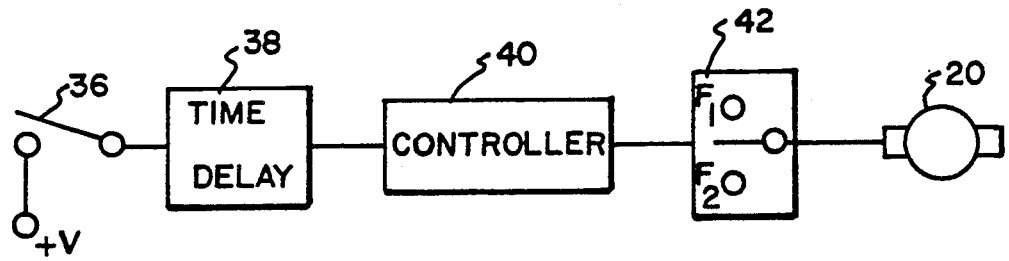
FIG. 5 is a schematic diagram of a control circuit according to the invention.

As illustratively shown in FIG. 5, a first embodiment for assuring the presence of requisite slack is shown in the form of a circuit diagram. When the switch or sensor 36 determines that insufficient slack is present at 34, an output signal is passed to the time delay circuit 38. This time delay circuit is provided for the purpose of requiring that the output from the sensor 36 be present for a set period of time to prevent any inadvertent slapping of the sensor 36 by the chain 12 from triggering false indications of the absence of slack. In other words, only when the sensor switch 36 has been activated for a set period of time is there an output signal indicative of any absence of slack. The time delay 38 affectively filters out transients or false readings. The time-delayed output of the sensor 36 is then passed to a controller 40 which presents an output signal to the switch 42. As shown, the switch 42 is operative to interconnect the associated motor 20 with either a first normal operating voltage of frequency $f_1$ or a second voltage of higher frequency $f_2$. The output of the controller 40 will cause the switch 42 to interconnect the motor 20 to the higher frequency $f_2$ as long as the switch 36 remains actuated after the set period of time of the time delay 38 has expired. The resulting increase in speed of the motor 20 will then generate sufficient slack 34 to disengage the switch 36, terminating the output of the controller 40, and causing the switch 42 to again pass voltage at normal frequency $f_1$ to the motor 20, to then operate at normal speed.

With reference to FIG. 5, it will also be appreciated that in the case of a hydraulic or pneumatic motor, the switch 42 may compromise a valve switched between normal and faster fluid flow rates to temporarily increase to rotational speed of the motor 20 to allow for the generation of the requisite slack.

Figure 6:
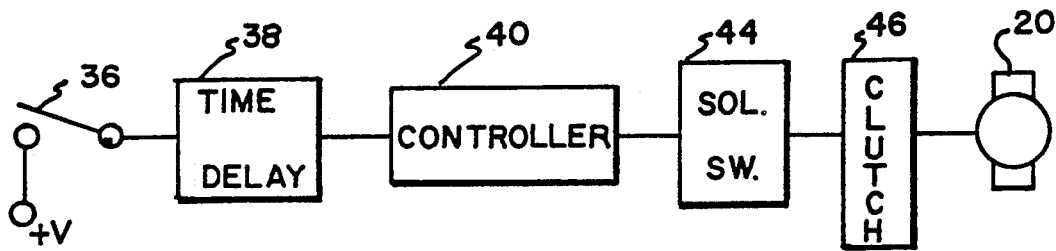
FIG. 6 is a schematic diagram of yet another control system according to the invention.

With reference to FIG. 6, yet another embodiment of the circuitry of the invention may be seen. Here the same switch 36, time delay circuit 38, and controller 40 are provided. However, in this embodiment a solenoid switch 44 is interconnected with a clutch 46 of the motor 20. The solenoid switch 44 causes the clutch 46 to switch gearing or belt drives on the motor 20 to mechanically achieve an increase in rotational speed. In other words, while the motor itself may continue to operate at the same speed, switching of gears or pulleys at the motor 20 may cause the desired increase in rotational speed to the pulley 30.

As discussed with respect to the circuits of both FIGS. 5 and 6, the generation of slack may be obtained by simply speeding up the associated motor 20 until activation of the switch 36 terminates. It is also contemplated as a part of the invention that a second sensor 48 may be provided in juxtaposition to the loop 34 on an opposite side thereof from the sensor 36. The sensor or switch 48, again of any suitable nature, simply senses the presence of sufficient slack in the loop 34 and thereby terminates the accelerated operation of the associated motor 20. Effectively, the sensor or switch 48 simply provides another input to the controller 40 in the circuits of FIGS. 5 and 6, terminating activity of the switches 42, 44 when the loop 34 contacts the switch 48.

It will be appreciated that each of the motors 20-26 of the plural work stations of the conveyor system 10 will have the type of slack-generating structure just discussed. Accordingly, each of the drive motors is constantly monitored to determine if, indeed, it is providing a motive force to the system or is acting as a load. If the motor is not providing motive force, its operation is temporarily modified to effectively cause it to operate in synchronization with the other motors of the system to share its portion of the load.

Thus it can be seen the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breath of the invention reference should be had to the following claims.

What is claimed is:

1. A case drive mechanism, comprising:
    a pair of conveyors in spaced apart parallel relationship to each other;
    a pair of drive means for driving said pair of conveyors, each of said drive means being exclusively connected to one of said conveyors;
    sensing means in juxtaposition to each of said conveyors for sensing slack in said conveyors; and
    speed control means interconnected between said sensing means and said drive means for altering a drive speed of said drive means in response to an output signal from said sensing means.

2. The case drive mechanism according to claim 1, wherein each of said pair of conveyors comprises a continuous chain.

3. The case drive mechanism according to claim 2, wherein each said drive means comprises first and second drive motors interconnected with an associated one of said chains.

4. The case drive mechanism according to claim 3, wherein each said drive means further comprises a drive wheel and an idle wheel interconnected by said associated one of said chains, said drive wheel being interconnected with and driven by one of said first and second drive motors.

5. The case drive mechanism according to claim 4, wherein said sensing means is interposed between said drive wheel and idle wheel.

6. The case drive mechanism according to claim 5, further comprising time delay means interposed between said sensing means and said speed control means, said time delay means actuating said speed control means when said output signal has been present for a predetermined period of a time.

7. The case drive mechanism according to claim 6, wherein said speed control means increases said drive speed of an associated one of said drive motors to increase said slack in said associated one of said chains.

8. The case drive mechanism according to claim 7, wherein said speed control means increases said drive speed until said sensing means indicates a presence in said associated chain of a predetermined amount of slack.

* * * * *